(12) United States Patent
Horton et al.

(10) Patent No.: US 9,156,035 B1
(45) Date of Patent: Oct. 13, 2015

(54) METHOD FOR PROGRESSIVE SEPARATION AND EXTRACTION OF RAW MATERIALS FROM RESIDENTIAL ROOFING PRODUCTS

(71) Applicant: ASR Holding Company, Barrington, RI (US)

(72) Inventors: Jonathon Daniel Horton, Barrington, RI (US); Alan Clarke, Bristol, TN (US)

( * ) Notice: Subject to any disclaimer, the term of this patent is extended or adjusted under 35 U.S.C. 154(b) by 0 days.

(21) Appl. No.: 14/191,046

(22) Filed: Feb. 26, 2014

Related U.S. Application Data

(63) Continuation-in-part of application No. 13/755,918, filed on Jan. 31, 2013, now Pat. No. 8,919,681.

(60) Provisional application No. 61/592,644, filed on Jan. 31, 2012.

(51) Int. Cl.
*B02C 23/00* (2006.01)
*B02C 23/14* (2006.01)
*B02C 23/16* (2006.01)
*B02C 23/10* (2006.01)

(52) U.S. Cl.
CPC ............... *B02C 23/14* (2013.01); *B02C 23/10* (2013.01); *B02C 23/16* (2013.01)

(58) Field of Classification Search
CPC .......... B02C 23/08; B02C 23/10; B02C 23/14
USPC .............. 241/24.1, 24.12, 27, 20; 209/3
See application file for complete search history.

(56) References Cited

U.S. PATENT DOCUMENTS

| | | |
|---|---|---|
| 4,706,893 A | 11/1987 | Brock |
| 4,726,846 A | 2/1988 | Jackson |
| 5,098,025 A | 3/1992 | Drouin |
| 5,201,472 A | 4/1993 | Brock |
| 5,337,901 A | 8/1994 | Skaer |
| 5,337,965 A | 8/1994 | Chiovitti |
| 5,385,426 A | 1/1995 | Omann |
| 5,848,755 A | 12/1998 | Zickell |
| 5,938,130 A | 8/1999 | Zickell |
| 6,120,838 A | 9/2000 | Zickell |
| 6,186,700 B1 | 2/2001 | Omann |
| 6,228,503 B1 | 5/2001 | Zickell |
| 6,290,152 B1 | 9/2001 | Zickell |
| 6,439,139 B1 | 8/2002 | Jones |
| 7,238,408 B2 | 7/2007 | Aschenbeck et al. |
| 8,168,032 B2 | 5/2012 | Kalkanoglu et al. |
| 8,177,152 B2 | 5/2012 | Harmon |
| 8,783,590 B2 | 7/2014 | Zickell |
| 8,919,681 B1 * | 12/2014 | Horton et al. .............. 241/20 |
| 2005/0274068 A1 | 12/2005 | Morton et al. |
| 2008/0184661 A1 | 8/2008 | Lombard |
| 2014/0014000 A1 | 1/2014 | Owens Corning |
| 2014/0034762 A1 | 2/2014 | Zickell |

* cited by examiner

*Primary Examiner* — Faye Francis
(74) *Attorney, Agent, or Firm* — Patent GC; Naomi S. Biswas

(57) ABSTRACT

This invention relates to a progressive method of separating and extracting raw materials from residential roofing products for re-use as ingredients for asphalt and fiberglass related products, including roofing materials. The method includes reduction, separation and then extraction of raw materials. The resulting products are alternative roofing granules, asphalt coated limestone, limestone, recycled asphalt and recycled fiberglass strand powders.

19 Claims, 1 Drawing Sheet

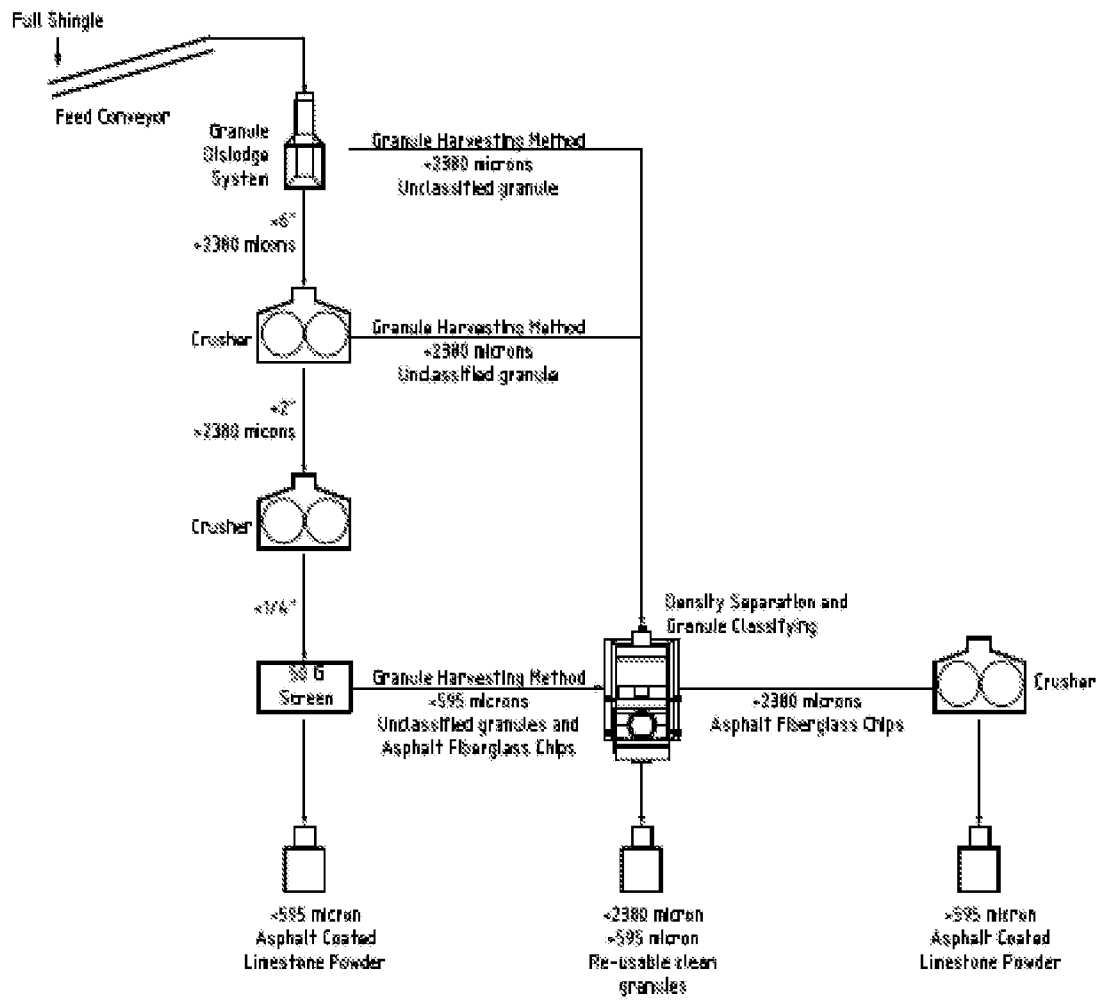

METHOD FOR PROGRESSIVE SEPARATION AND EXTRACTION OF RAW MATERIALS FROM RESIDENTIAL ROOFING PRODUCTS

RELATED APPLICATIONS

This is a continuation-in-part application of U.S. patent application Ser. No. 13/755,918, filed on Jan. 31, 2013, which claims priority from provisional application Ser. No. 61/592,644, filed on Jan. 31, 2012, and herein incorporated by reference.

FIELD OF THE INVENTION

The invention relates generally to the recycling of residential roofing products, and in particular, to a system and method for recycling of asphalt shingles utilizing the combination of mechanical reduction, screening by size, and extraction. The present invention is directed to a progressive process for treating a multi-component waste material to recover the component parts thereof, more specifically to a process for treating waste asphalt shingles to recover the solid components thereof, as well as asphalt. Additionally, the present invention provides an economic process for treating waste asphalt shingles to recover asphalt and solid components thereof.

BACKGROUND OF THE INVENTION

There is a need in the industry for an effective and economical method for recycling residential roofing products, including shingles. There is a large volume of waste created annually in connection with residential roofing products. Over 12 million tons of waste are created annually, with 11 million tons post-consumer tear-off debris and 1 million tons of manufacturers' waste. Contractors spend enormous amounts of money in waste hauling. This waste also is detrimental to the environment, as the asphalt shingles take up a lot of space in landfills and take several generations to decompose. Accordingly, there is a need in the industry for an effective recycling method of residential roofing products. The present invention provides such a method.

SUMMARY OF THE INVENTION

This invention is directed to a progressive method of separating and extracting raw materials from residential roofing products, the method comprising: (a) mechanically shredding material to liberate granules; (b) screening with sizing shakers to harvest granules; (c) progressively mechanically reducing the size of the residential roofing products to produce chip products; (d) subsequently progressively screening the chip products to separate the chip products by size into large, medium, and small aggregate products, wherein the large aggregate products are comprised of asphalt-coated fiberglass chips, the medium aggregate products are comprised of asphalt coated granules, and the small aggregate products are comprised of asphalt limestone powder; and (e) extracting raw materials from the large, medium, and small aggregate products, by the following steps: (i) performing extraction on the large aggregate products, wherein the extraction results in the formation of calcium carbonate, fiberglass strands and powder, roofing granules, and liquid asphalt; and (ii) separating the medium aggregate products by density, wherein the density separation results in the formation of reusable clean granules, middling limestone and fractured granule powder, and asphalt powder.

BRIEF DESCRIPTION OF THE DRAWINGS

FIG. 1 is a flowchart of the process of the invention.

DETAILED DESCRIPTION OF THE INVENTION

The invention is directed to a progressive method of separating and extracting raw materials from used and new residential roofing products. The new residential roofing products include commercial waste scrap, such as waste from a shingle manufacturing plant, and the used products include post-consumer use products, such as residential roof products of varying ages which have previously been on the roofs of buildings. A preferred embodiment of the residential roofing products includes used shingles.

The method of the present invention comprises the following steps: (1) progressively mechanically reducing the size of the residential roofing products to produce chip products; (2) subsequently progressively screening the chip products to separate the chip products by size into small, medium, and large aggregate products, and (3) extracting raw materials from the aggregate products. This method is shown in the flowchart of FIG. 1. Each of these steps is described in more detail below.

The method of the present invention returns the shingles back into the various components which were originally combined together in order to make the shingles. Shingles are generally comprised of asphalt powder, limestone, granules (painted rocks or coal slag), and a fiberglass sheet. In a typical shingle manufacturing process, these elements are combined in order to create shingles. Liquid asphalt is heated and then mixed with powdered limestone. A fiberglass sheet is then coated with the asphalt and limestone mix, resulting in a limestone and asphalt coated-fiberglass sheet. Colored granules are then dropped on to the fiberglass sheet, to give shingles their color. In the present shingle recycling process, roofing granules, asphalt coated limestone, limestone, recycled asphalt and recycled fiberglass strand powders are recovered.

Mechanical Reduction Details

The first step in the progressive recycling process of the present invention is mechanically reducing the size of the residential roofing products to produce chip products and harvest granules. The mechanical reduction can progressively occur up to 10 times, preferably between 2-5 times, and most preferably 3 times. The mechanical reduction can be performed by any method known in the art to reduce the size of products, including shredding or cutting, impact grinding, and the use of a ball mill. In one embodiment, the mechanical reduction of shredding or cutting can be performed by using a wood chipper. In a preferred embodiment, the reduction is first through a shredder, and then progressively reduced further through impact with a Hammermill Crusher. Cutting or shredding, common in the carpet industry, can have a single rotor that allows a shingle to be shredded into a specific size or piece, through use of a sizing screen. Sizing screens to be used with the present invention can vary in size, ranging from about 3" to about 8", preferably from about 4" to about 6", and most preferably about 6". A hopper component allows for easy loading of large size shingle scraps. Large pieces go into a powerful industrial cutting chamber. The shingle is cut by steel cutters at a low speed and high torque. The chip products produced by the mechanical reduction are of varying size, and are all preferably less than 2 inches in size, and in a further embodiment the chip products are less than ¼ inch in size. In addition to the chip products being produced, the impact grinding, cutting, or ball mill reduction also produces asphalt powder and roofing granules.

Impact grinding can utilize a crusher, a machine designed to reduce large materials into smaller pieces. Crushers may be used to reduce the size of materials so they can more easily be recycled. Crushing devices hold material between two parallel or tangent solid surfaces, and apply sufficient force to bring the surfaces together to generate enough energy within the material being crushed so that its molecules separate from (fracturing), or change alignment in relation to (deformation), each other. Impact crushers involve the use of impact rather than pressure to crush material. The material is contained within a cage, with openings on the bottom, end, or side of the desired size to allow pulverized material to escape. This type of crusher can be used for roof products.

Another type of reducer is a hammermill, which is essentially a steel drum containing a vertical or horizontal rotating shaft or drum on which hammers are mounted. The hammers are free to swing on the ends of the cross, or fixed to the central rotor. The rotor is spun at a high speed inside the drum while material is fed into a feed hopper. The material is impacted by the hammer bars and is thereby shredded and expelled through screens in the drum of a selected size.

A ball mill is another type of grinder, which is a cylindrical device used in grinding materials, including roofing products. Ball mills rotate around a horizontal axis, partially filled with the material to be ground plus the grinding medium. Different materials are used as media, including ceramic balls, flint pebbles and stainless steel balls. An internal cascading effect reduces the material to a fine powder.

In prior art processes of shingle recycling, cutting, impact grinding, or a ball mill has been used to reduce the size of shingles, but these reduction methods have not been used in combination with the other steps of the present progressive method. When reduction is used alone, without the present additional steps of separation and extraction, a broad array of sizes of chip products are created. This broad spectrum of chip product sizes is too broad for these shingle chips to be re-usable as raw materials in the production of new asphalt roofing shingles. The process of the present invention allows for roofing manufacturers to reuse important raw materials. With such a broad range of sizes in the resultant chip products from prior art processes, the product can only be down-cycled. Accordingly, there is a need in the art for a method of recycling residential roofing products which allows the resultant products to be used for a variety of purposes once recycled. The present invention provides such a method by combining reduction with the additional steps of separation, and extraction, as described below. The process of the present invention will, for the first time, allow manufacturers to reuse raw materials from shingles. Roofing manufacturers will now be able to design new products with reusability in mind.

Screening Details

After size reduction, the residential roofing chip products undergo separation by size, through a screening step. The screening step separates the chip products into small, medium, and large aggregate products. The large aggregate products are comprised of asphalt-coated fiberglass chips and are greater than about 2380 microns (2.38 mm) in size. The medium aggregate products are comprised of and mesh granules and are between about 595 and about 2380 microns in size. The small aggregate products are comprised of asphalt powder and are less than about 595 microns in size.

The screening uses any type of screen known in the art which separates products by size. One embodiment for screening is a sizing shaker, which is used to separate dry, flowable products by specific size. The sizing shaker for granule harvesting includes ball trays to minimize screen blinding and liberate granules from roofing sheet. The sizing shaker helps to remove the hard trap rock. Another type of screen includes a sieve mat which vibrates using a trampoline style, and which may vibrate up to 50G of force, or more. The screening process may be done in accordance with the disclosures of U.S. Pat. Nos. 7,344,032 and 7,654,394, which are hereby incorporated by reference. The motion of the sieve mat sections is such that in the unflexed condition a sag will be formed. Then moving to the flexed condition, the mat section will be snapped toward a flatter/straighter form. Referred to as a "flip flow" method, during the cycling of the screener, the flexible mat sections are individually tensioned and relaxed which breaks or loosens the adhesive bond between materials and between the material and the screen mats. In the upstroke, material is impelled upwardly functioning much like a trampoline and air is drawn into and thru the material. The motion is such that in an example screening machine, the acceleration on the main support frame is about 3 g's, but the material on the sieve mat may experience up to 50 g's.

The sieve mat used to separate products by size includes perforations, the perforations being of a size and shape so as to permit particles of a given size to pass through for sorting. The individual perforations may be tapered and arranged in any suitable pattern and location. The perforation size, shape and pattern, as well as the material and thickness, can vary and will be chosen for the given material screening application. The sieve mat may be formed of any suitable material which has the desirable properties of flexibility and strength in addition to abrasion, rust and corrosion resistance. The material used for the sieve mats is mechanically strong and preferably a resilient elastomer with a balanced range of properties which is able to withstand deformation without loss of elasticity or dimensional accuracy. One such material is a resilient flexible polymer such as polyurethane for example. The sieve mats may be constructed of single homogenous material or may be reinforced such as with internal cables or bars, or with a suitable screen backing. One preferred embodiment is a mesh screen. The mesh screens may be in a variety of different screen mesh sizes, including greater than 4 mesh, less than 4 mesh, and between 4 and 30 mesh. The size of the products separated according to the screen mesh size is shown in the Table 1 below:

TABLE 1

MESH TO MICRON CONVERSION

| U.S. MESH | INCHES | MICRONS | MILLIMETERS |
| --- | --- | --- | --- |
| 3 | 0.2650 | 6730 | 6.730 |
| 4 | 0.1870 | 4760 | 4.760 |
| 5 | 0.1570 | 4000 | 4.000 |
| 6 | 0.1320 | 3360 | 3.360 |
| 7 | 0.1110 | 2830 | 2.830 |
| 8 | 0.0937 | 2380 | 2.380 |
| 10 | 0.0787 | 2000 | 2.000 |
| 12 | 0.0661 | 1680 | 1.680 |
| 14 | 0.0555 | 1410 | 1.410 |
| 16 | 0.0469 | 1190 | 1.190 |
| 18 | 0.0394 | 1000 | 1.000 |
| 20 | 0.0331 | 841 | 0.841 |
| 25 | 0.0280 | 707 | 0.707 |
| 30 | 0.0232 | 595 | 0.595 |
| 35 | 0.0197 | 500 | 0.500 |
| 40 | 0.0165 | 400 | 0.400 |
| 45 | 0.0138 | 354 | 0.354 |
| 50 | 0.0117 | 297 | 0.297 |
| 60 | 0.0098 | 250 | 0.250 |
| 70 | 0.0083 | 210 | 0.210 |

TABLE 1-continued

MESH TO MICRON CONVERSION

| U.S. MESH | INCHES | MICRONS | MILLIMETERS |
|---|---|---|---|
| 80 | 0.0070 | 177 | 0.177 |
| 100 | 0.0059 | 149 | 0.149 |
| 120 | 0.0049 | 125 | 0.125 |
| 140 | 0.0041 | 105 | 0.105 |
| 170 | 0.0035 | 88 | 0.088 |
| 200 | 0.0029 | 74 | 0.074 |
| 230 | 0.0024 | 63 | 0.063 |
| 270 | 0.0021 | 53 | 0.053 |
| 325 | 0.0017 | 44 | 0.044 |
| 400 | 0.0015 | 37 | 0.037 |

Mesh Sizes and Microns

What does mesh size mean? Figuring out mesh sizes is simple. All you do is count the number of openings in one inch of screen (in the United States, anyway.) The number of openings is the mesh size. So a 4-mesh screen means there are four little squares across one linear inch of screen. A 100-mesh screen has 100 openings, and so on. As the number describing the mesh size increases, the size of the particles decreases. Higher numbers equal finer material. Mesh size is not a precise measurement of particle size.

What do the minus (−) and plus (+) plus signs mean when describing mesh sizes? Here's a simple example of how they work. −200-mesh would mean that all particles smaller than 200-mesh would pass through. +200 mesh means that all the particles 200-mesh or larger are retained.

How fine do screens get? That depends on the wire thickness. If you think about it, the finer the weave, the closer the wires get together, eventually leaving no space between them at all. For this reason, beyond 325-mesh particle size is usually described in "microns."

What is a micron? A micron is another measurement of particle size. A micron is one-millionth of a meter or one twenty-five thousandth of an inch.

| Sieve Mesh # | Inches | Microns | Typical Material |
|---|---|---|---|
| 14 | .0555 | 1400 | — |
| 28 | .028 | 700 | Beach Sand |
| 60 | .0098 | 250 | Fine Sand |
| 100 | .0059 | 150 | — |
| 200 | .0029 | 74 | Portland Cement |
| 325 | .0017 | 44 | Silt |
| 400 | .0015 | 37 | Plant Pollen |
| (1200) | .0005 | 12 | Red Blood Cell |
| (2400) | .0002 | 6 | — |
| (4800) | .0001 | 2 | Cigarette Smoke |

The mesh numbers in parentheses are too small to exist as actual screen sizes; they are estimates included for reference.

The screening step separates the chip products into small, medium, and large aggregate products. The small aggregate products comprise asphalt powder, which is produced as a by-product from the grinding during the reduction step. After the screening step, the asphalt powder is recovered in its usable form, and is not subject to any additional steps. The medium and large aggregate products are run through an additional extraction step, in order to recover usable materials. The medium aggregate products comprise the granules, the rocks used to color shingles. The large aggregate products comprise asphalt-coated fiberglass chips, which will be further reduced to limestone (calcium carbonate), fiberglass strands and powder, roofing granules, and liquid asphalt, in the extracting steps described in more detail below.

Extraction Details

The extraction step is performed by the following steps: (1) performing extraction on the large aggregate products, wherein the extraction results in the formation of calcium carbonate, fiberglass strands and powder, roofing granules, and liquid asphalt; (2) obtaining the asphalt powder; and (3) separating the medium aggregate products by density, wherein the density separation results in the formation of reusable clean granules, middling powder, and asphalt powder.

Extraction is performed on the large aggregate products, which are preferably less than about 2 inches, less than 1½ inches, less than ⅜ inch, or less than ¼ inch in size. In one embodiment, the large aggregate products are between about 4,760 microns and about 1½ inches, more preferably between about 4,760 microns and about ⅜ inches, and most preferably between about 2,380 microns and ¼ inch. The large aggregate products comprise asphalt-coated fiberglass chips. These chips are then subjected to extraction, which results in the recovery of calcium carbonate, fiberglass strands and powder, roofing granules, and liquid asphalt. In a preferred embodiment, the extraction is performed by using a Solvent Extractor. In an additional embodiment, the extraction is performed by contacting the large aggregate products with extraction streams of successively increasing solvent concentrations, for a time sufficient to dissolve the asphalt and form an asphalt-enriched miscella, and then separating said asphalt-enriched miscella from solid components. The extraction process can be performed according to the disclosure as outlined in U.S. Pat. No. 4,222,851, which is hereby incorporated by reference.

The medium aggregate products comprise granules which are still coated with asphalt. The products are then separated by using a density separator. Any density separator known in the art can be utilized in the present invention. A density separator separates particles in a fluid or dry medium based on a difference in settling velocity. The medium can be a slurry of particles kept suspended in a liquid medium by vibration and/or agitation. Additionally, a suspension in a gaseous medium, usually air, can also used. There are many sizing and classifying methods which employ gravity of solid material in hydrous slurry with an incoming feed containing the material encountering an upward teeter water flow. The variation in size and/or density will result in heavier particles failing to a lower level of the hindered-bed settler and lighter particles being uplifted to an overflow level of the hindered-bed settler thus affecting the desired separation. With a gravity separator, the heavier or more dense particles are separated from dry, lighter more flowable products. Fiberglass, asphalt and consequently asphalt coated limestone is more dense than granules which are comprised of trap rock. Some roofing manufacturers back coat shingles with sand and pulverized silica aggregates. Below is a list of densities of various materials which are common byproducts of shingle recycling

| | Bulk Density | |
|---|---|---|
| Material | (lb/ft3) | (g/cc) |
| Fiberglass (½" long chopped strand) | 17-48 | 27-77 |
| Limestone (Ground) | 59 | 0.95 |
| Limestone | 60 | 0.96 |
| Limestone Filler | 63 | 1.01 |
| Limestone (Pulverized) | 68 | 1.09 |
| Limestone Dust | 69 | 1.11 |
| Limestone Flour | 69 | 1.11 |
| Asphalt Binder | 80-85 | 1.28-1.36 |

-continued

| Material | Bulk Density | |
|---|---|---|
| | (lb/ft3) | (g/cc) |
| Trap Rock | 91 | 1.46 |
| Sand, Foundry, Coarse | 96 | 1.54 |
| Sand, Foundry, NJ Silica | 97 | 1.55 |
| Sand, Foundry, Fine | 104 | 1.67 |

One embodiment of a density separator is a hindered-bed separator, as described in U.S. Pat. No. 6,264,040, and which is hereby incorporated by reference. This hindered-bed separator is a vessel in which water is evenly introduced across the base of the device and rises upward. The separator typically has an aspect ratio of two or more and is equipped with a means of discharging faster settling solids through the bottom of the unit. Rising water and light solids flow over the top of the separator and are collected in a launder. Solids are introduced in the upper portion of the vessel and begin to settle at a rate defined by the particle size and density. The coarser solids settle at a rate that exceeds that of the rising water. A restricted orifice in the base of the separator regulates the discharge of the coarse solids. As a result, a teetering, high-density bed of particles is maintained within the separator. The small interstices within the teeter bed create high interstitial liquid velocities that resist penetration of the finer particles. The fines, therefore, are maintained in the upper portion of the separator and discharge over the top into a collection launder.

Other density separators known in the art include those as described in U.S. Pat. Nos. 6,264,040; 7,997,414; and Publication Nos. US 2003/0234227; 2010/0303875; and 2009/0110818, all of which are hereby incorporated by reference.

Another density separator which can be used with the present invention is an allflux separator, a round center feed separator that is sized according to the hydraulic load. This type of density separator uses fluidized bed and rising current technology for the separation and hydraulic classification of slurried fines. This is described in EP 0 508 355, and is herein incorporated by reference.

Another density separator which can be used with the present invention is a gravity separator that is sized, by air according to specific gravity. This type of density separator uses an air fluidized bed for the separation and density classification of light and heavy materials. One example of such a gravity separator is described in U.S. Pat. No. 3,439,805, herein incorporated by reference. Other examples of suitable gravity separators which can be used to separate granular products of like and different sizes in a dry environment include the LMC Marc Gravity Separator and the Cimbria Gravity Separators. In the Cimbria Gravity Separator, as an example, products processed by a gravity separator are separated into layers with different specific weight according to the "fluid bed" principle. The deck is fluidized by a completely uniform pressurized air system stratifying the light material to the top of the product bed and allowing the heavy material to contact the deck surface. The deck is inclined from side to side and inlet end to discharge end at adjustable angles. The heavy material, contacting a specially designed square wire deck surface moves up hill, while the light material fluidised by the air system moves down hill due to gravitational pull.

In the present invention, this separation by density, either in a slurry or in a dry environment, results in obtaining clean granules, middling powder, and asphalt powder. The clean granules obtained may be either a single color (if the beginning product was of a single color) or a mix of colors. If the clean granules are a mix of colors, then they can be used in the headlap portion of the new shingles. Since the headlap portion of a shingle is hidden by the shingle above it, the headlap portion may have mixed-color granules.

EXAMPLES

Below is an example demonstrating how the progressive process of the present invention takes used shingles and recycles them into reusable products. Each step in the process is illustrated in the below Example.

Example 1

Steps of Progressively Processing Asphalt Shingles

1. Collection of used or manufacturer scrap shingles at processing center
2. Organize shingles in sorting area
3. Removal of large non recyclables in sorting area
4. Place material in accumulation container
5. Conveyor moves material from accumulation to picking conveyor and metal detector and then material moves to shredder
6. Shredder liberates granules and shreds shingle into 6" and smaller strips
7. Material flows over a sizing shaker, harvesting or sizing all material, including granules smaller than 2380 microns
8. Hammermill 1 reduces 6" and smaller strips of shingle to less than 2" in size
9. Material flows over a sizing shaker, harvesting or sizing all material, including granules smaller than 2380 microns
10. Hammermill 2 reduces 2" and smaller pieces of shingle to less than ¼" in size
11. Magnets remove nails
12. ¼" minus material moves to 50G screening
13. Material is separated and classified into three sizes: smaller than 595 microns, between 595 microns and 2380 microns, and greater than 2380 microns but less than ¼"
14. Smaller than 595 microns is considered finished goods and ready for use as asphalt coated limestone in asphalt shingle and related products
    a. Material is used in conjunction, or blended, with virgin raw materials as coating for shingles
    b. Resulting calcium carbonate can be used as filler
15. Raw material from steps 7 and 9 is combined with raw material between 595 and 2380 microns and further separated using density separation process (either with a density separator with a slurry or a gravity separator with air) producing minus 595 microns asphalt coated limestone and alternative granules sized between 2380 microns and 595 microns.
    a. Alternative granules are used as headlap for residential asphalt roofing shingles, or
    b. Alternative granules are used as sand finish for asphalt coating 16. Raw material greater than 2380 microns in size but smaller than ¼" is sent to hammermill 3
17. Hammerill 3 reduces material to minus 595 microns
   a. Material is used in conjunction, or blended, with virgin raw materials as coating for shingles
   b. Resulting calcium carbonate can be used as filler While the invention has been particularly shown and described with reference to certain embodiments, it will be understood by those skilled in the art that various changes in form and detail may be made without departing from the spirit and scope of the invention. The scope of the present invention should, therefore, be determined only by the following claims.

What is claimed is:

1. A method of progressively separating and extracting raw materials from residential roofing products, the method comprising:
   a) mechanically shredding residential roofing products to dislodge granules to produce shredded strip products,
   b) screening the dislodged granules and shredded strip products from step (a) with a sizing shaker to harvest dislodged granules by size,
   c) mechanically reducing the size of the shredded strip products to produce chip products;
   d) screening the chip products from step (c) to separate the chip products from granules by size, resulting in chip products and small products, wherein the chip products are comprised of asphalt-coated fiberglass chips and middle sized asphalt coated limestone powder, and the small products are comprised of small sized granules and small sized asphalt coated limestone powder;
   e) mechanically reducing the size of the asphalt coated fiberglass chips and middle sized asphalt coated limestone powder from step (d) to produce small sized powder products,
   f) separating both the small sized granules and small sized powder product by density separation in a dry medium using air fluidization, comprising the following steps:
      i. separating the small sized granules, harvested during the shredding of step (a) and the chip process of step (d), from the powder of steps (d) and (e) by density, wherein the density separation results in the formation of reusable clean granules and asphalt coated limestone powder, and
      ii. separating the small sized powder products from remaining granules by density, wherein the density separation results in the formation of reusable clean granules and asphalt coated limestone powder,
   g) screening the asphalt coated limestone powder chip products by size into medium aggregate and small aggregate products, wherein the medium aggregate products are comprised of asphalt-coated fiberglass chips and powder and the small aggregate products are comprised of asphalt coated limestone powder;
   h) mechanically reducing the size of the medium asphalt-coated limestone and fiberglass chips to produce small sized powder products, and
   i) finishing the resulting product by further size screening producing small aggregate products comprised of asphalt coated limestone powder.

2. The method of claim 1, wherein the mechanical shredding in step (a) is performed by using a shredder, ball mill, hammermill crusher or wood chipper.

3. The method of claim 1, wherein the mechanical shredding in step (a) produces shredded strip products greater than 1½ inches in size.

4. The method of claim 1, wherein the screening in step (b) is performed using a sizing shaker screen comprising a plurality of sieve mats.

5. The method of claim 4, wherein the sieve mats screen particles less than about 2380 microns.

6. The method of claim 1, wherein the screening in step (d) is performed by using a 50G force screen.

7. The method of claim 6, wherein the screening is performed using a sizing shaker.

8. The method of claim 1, wherein the small aggregate products in step g are less than about 595 microns in size.

9. The method of claim 1, wherein the medium aggregate products in step g are greater than about 595 microns.

10. The method of claim 1, wherein the separating in step f is performed by using a density separator.

11. The method of claim 10, wherein the density separator is a gravity separator.

12. The method of claim 1, wherein the residential roofing product comprises a shingle.

13. The method of claim 1, wherein the mechanical reduction in step (c) is performed using a ball mill, hammermill crusher, or wood chipper.

14. The method of claim 1, wherein the mechanical reduction in step (e) is performed using a ball mill, hammermill crusher, or wood chipper.

15. The method of claim 1, wherein the mechanical reduction in step (h) is performed using a ball mill, hammermill crusher, or wood chipper.

16. The method of claim 1, wherein the screening in step (g) is performed using a 50G force screen.

17. The method of claim 16, wherein the screening is performed using a sizing shaker.

18. The method of claim 1, wherein the screening in step (i) is performed using a 50G force screen.

19. The method of claim 18, wherein the screening is performed using a sizing shaker.

* * * * *